United States Patent Office 3,793,439
Patented Feb. 19, 1974

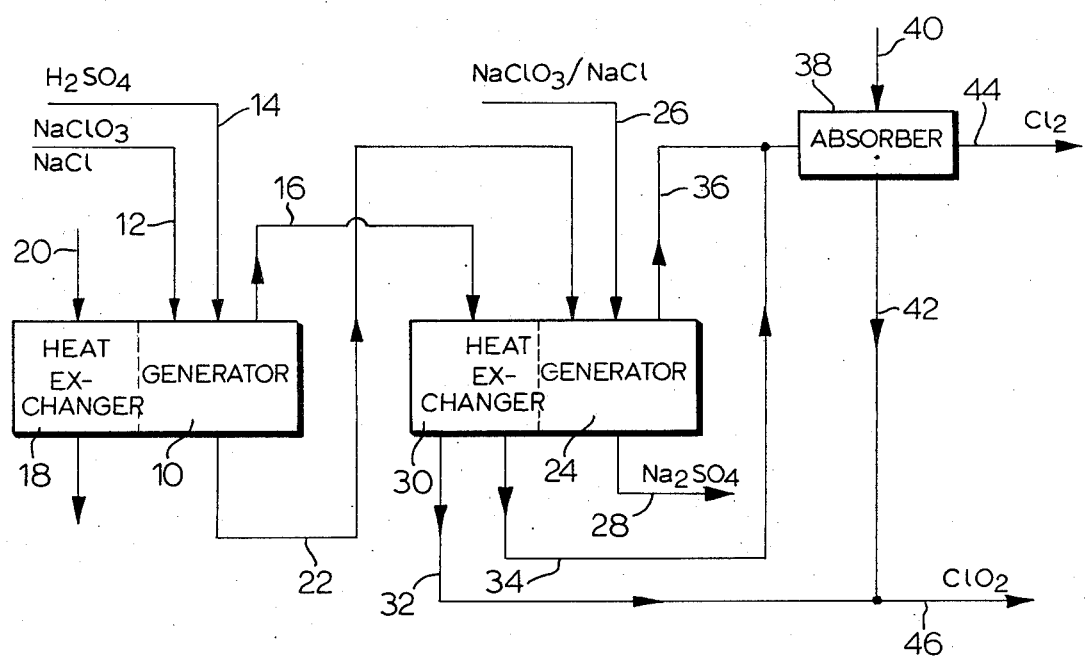

3,793,439
PRODUCTION OF CHLORINE DIOXIDE
William H. Rapson, Scarborough, Ontario, Canada, assignor to Erco Industries Limited, Islington, Ontario, Canada
Filed Feb. 17, 1971, Ser. No. 116,090
Int. Cl. C01b 7/02, 11/02; C01d 5/00
U.S. Cl. 423—478                                    21 Claims

ABSTRACT OF THE DISCLOSURE

An alkali metal chlorate is reduced in an acid medium in a multiplicty of reaction zones at least one of which operates to evaporate water from the reaction medium to produce chlorine dioxide The steam is used to provide at least part of the heat requirement of at least one further zone. In this way thermal economy is effected.

---

This invention relates to the production of chlorine dioxide, more particularly to the economic production of chlorine dioxide from two or more generators.

Chlorine dioxide is used in the bleaching of cellulosic fibrous materials, such as, wood pulp produced by the Kraft or sulfite processes.

Chlorine dioxide is known to be prepared in a variety of ways, involving the reduction of an alkali metal chlorate, generally sodium chlorate, in an acid solution utilizing sulphur dioxide, sulphuric acid, chromic sulphate, methanol, sodium chloride or hydrochloric acid as reducing agents. The basic reaction in all such processes is that between chlorate and chloride in the acid solution to produce chlorine dioxide, chlorine and water, in accordance with the equation:

$$2H^+ + ClO_3^- + Cl^- \rightarrow ClO_2 + \tfrac{1}{2}Cl_2 + H_2O$$

When sodium chloride or hydrochloric acid is the reducing agent, then chlorine is produced along with the chlorine dioxide. In the presence of other reducing agents, the chlorine is reduced to chloride in the reacting solution so that the chlorine dioxide produced contains little chlorine.

The acid medium may be provided by sulphuric acid where the reducing agent is sodium chloride, and may be provided both by sulphuric acid and hydrochloric acid where the reducing agent is hydrogen chloride. The acid medium may be wholly provided by hydrogen chloride also acting as the reducing agent.

In Canadian Pat. 825,084 issued Oct. 14, 1969 to Electric Reduction Company of Canada, Limited, there is described a process of forming chlorine dioxide and chlorine from an alkali metal chlorate, an alkali metal chloride or hydrogen chloride or mixtures thereof, and sulphuric acid in which the chlorine dioxide and chlorine are generated and an alkali metal acid sulphate crystallized in the same reaction zone. Water is evaporated from the reaction medium to remove the chlorine dioxide and chlorine from the reaction zone. This may be achieved by subjecting the reaction zone to reduced pressure and operating at the boiling point of the reaction medium.

Where the alkali metal as sodium, the form of the acid sulphate is dependent on the temperature and acidity of the reaction medium. At high acidities around 10 to 12 N and temperatures of around 75 to 100° C., the sodium acid sulphate is in the form of sodium bisulphate ($NaHSO_4$). The reaction involved is represented by the equation:

$$NaClO_3 + NaCl + 2H_2SO_4 \rightarrow$$
$$2NaHSO_4 + ClO_2 + \tfrac{1}{2}Cl_2 + H_2O$$

At lower acidities, around 4.8 to 9 N and lower temperatures of around 30° to 70° C., sodium sesquisulphate ($Na_3H(SO_4)_2$) is formed. The reaction involved is represented by the equation:

$$3NaClO_3 + 3NaCl + 4H_2SO_4 \rightarrow$$
$$3ClO_2 + 3/2Cl_2 + 3H_2O + 2Na_3H(SO_4)_2$$

In Canadian Pat. 826,577 issued Nov. 4, 1969 to Electric Reduction Company of Canada, Limited, there is described a process of preparing chlorine dioxide and chlorine by reacting sodium chlorate, sodium chloride and sulphuric acid under conditions of low acidity, generally of the order of 2 to 4.8 N. This process may be performed in a single reaction zone in accordance with the process of Canadian Pat. 825,084, evaporating water from the reaction medium to remove the chlorine dioxide and chlorine, and generally precipitating anhydrous sodium sulphate ($Na_2SO_4$) in the reaction zone.

The reaction involved is represented by the equation:

$$NaClO_3 + NaCl + H_2SO_4 \rightarrow ClO_2 + \tfrac{1}{2}Cl_2 + H_2O + Na_2SO_4$$

In all of the above-described reactions there is the competing reaction:

$$NaClO_3 + 5NaCl + 3H_2SO_4 \rightarrow 3Cl_2 + 3Na_2SO_4 + 3H_2O$$

in which no chlorine dioxide is formed. This reaction becomes significant when the mole ratio of chloride to chlorate in the reactor feed substantially exceeds 1:1. In order to maximize production of chlorine dioxide from chlorate, it is preferred to operate the above process at approximately equimolar or slightly higher molar ratio of chloride to chlorate in the feed.

In accordance with the present invention, chlorine dioxide and chlorine are produced from a plurality of zones in which the chlorine dioxide and chlorine are removed from the zones by steam evaporated from the aqueous reaction media. The steam removed from one zone is used in accordance with the invention to provide at least part of the heat requirement of another zone.

In copending patent application Ser. No. 147,821, filed May 28, 1971 in the name of Electric Reduction Company of Canada, Limited there is described a process of producing chlorine dioxide in which a plurality of sulphuric acid-based reaction zones are provided operating at different acidities. One of the zones operates at a low acidity below 4.8 N and the remainder at a high acidity above 4.8 N. In the high acidity zone or zones, sodium acid sulphate is formed which is used as at least part of the acid requirement of the low acidity generator.

The present invention has particular applicability to this latter process and is now described with particular reference thereto. The invention is particularly described by way of example with reference to the accompanying drawing, which is a flow sheet of one embodiment of the invention.

A chlorine dioxide generator 10 such as the type disclosed in the above-mentioned Canadian Pat. 825,084 contains an aqueous reaction medium containing sodium chlorate and sodium chloride fed by line 12 generally in the form of an aqueous solution containing both salts and sulphuric acid fed by line 14. The molar ratio of sodium chlorate to sodium chloride in the feed stream preferably is about equimolar. The individual concentrations of chloride and chlorate in the reaction medium may vary over a wide range. For example, the concentration of chlorate may be in the range about 0.005 to about 3 molar and the concentration of the chloride may be in the range of about 0.001 to about 2 molar.

The generator 10 generally is maintained under a partial vacuum and the aqueous reaction medium preferably is at its boiling point. The temperature of the medium may vary over a wide range, such as from about 30° to about 80° C., although it is preferred to operate towards the higher end of the range for reasons that will become apparent hereinafter.

Chlorine dioxide gas at normal atmospheric pressure spontaneously decomposes with detonation. The water vapor evaporated from the aqueous solution in the generator dilutes the chlorine dioxide rendering it less susceptible to spontaneous decomposition. The chlorine dioxide and chlorine produced in the generator 10 are removed from the generator by the steam through line 16.

The generator 10 may be maintained at the reaction temperature in any convenient manner, such as a heat exchanger 18 to which steam is fed through line 20.

The acidity of the aqueous solution in the generator 10 is in excess of 4.8 N, generally between about 6 N and 12 N. The generator preferably is operated to maintain a substantially constant level of liquid therein by control of the rates of feed of aqueous sodium chlorate and sodium chloride solution and sulphuric acid and of evaporation of water. Any overflow liquor may be recycled to the feed lines.

Sodium acid sulphate is precipitated in the generator. The form of the acid sulphate depends on the acidity and temperature of the reacting solution. The acid sulphate generally is in the form of sodium bisulphate ($NaHSO_4$) since the generator 10 is usually operated at high acidity (about 10 N) and high temperature (about 75° C.). However, the sodium acid sulphate may be in the form of sodium sesquisulphate ($Na_3H(SO_4)_2$) when lower acidities and/or temperatures are employed.

The sodium acid sulphate is passed by line 22 from the generator 10 to a second generator 24. Sodium chlorate and sodium chloride, generally as an aqueous solution containing both salts, are fed to the generator 24 by line 26 and an aqueous reaction medium is provided in the generator.

The sodium acid sulphate fed through line 22 constitutes the sole source of acid in the reaction medium. It may be desirable in certain cases to supplement this acid feed with sulphuric acid. The reaction medium has an acidity of below 4.8 N, generally 2 N to 4.8 N, typically around 4 N.

Depending on the form of the sodium acid sulphate, two possible reactions may occur:

(a) $NaClO_3 + NaCl + 2NaHSO_4 \rightarrow$
$2Na_2SO_4 + ClO_2 + \frac{1}{2}Cl_2 + H_2O$, (b) $NaClO_3 + NaCl + 2Na_3H(SO_4)_2 \rightarrow$
$4Na_2SO_4 + ClO_2 + \frac{1}{2}Cl_2 + H_2O$ Generator 24 preferably is operated under reduced pressure and at the boiling point of the aqueous reaction medium therein. The level of the medium in the generator is maintained substantially constant by the same techniques as outlined above for generator 10. Anhydrous sodium sulphate is precipitated and may be removed by line 28.

The operating temperature of generator 24 is achieved in accordance with the present invention by passing the steam containing chlorine dioxide and chlorine from generator 10 by line 16 into a heat exchanger 30 associated with the generator 24.

Heat exchange occurs between the steam and the aqueous medium in the generator 24. The steam condenses and an aqueous solution of chlorine dioxide generally containing some dissolved chlorine is recovered from the heat exchanger by line 32. Gaseous chlorine and any remaining chlorine dioxide pass out of the heat exchanger through line 34 to a chlorine dioxide absorber 38.

Steam evaporated from the aqueous reaction medium in the generator 24 removes the chlorine dioxide and chlorine from the generator 24 by line 36 and the gaseous mixture passes to the absorber 38. Water may be fed by line 40 to the absorber 38 and an aqueous solution of chlorine dioxide containing some dissolved chlorine is recovered through line 42. Gaseous chlorine is removed by line 44.

Alternatively, the absorber may take the form of a condenser in which the steam is condensed and the heat of condensation is absorbed by water in a heat exchanger, such water being used to generate the steam to pass by line 20 to the heat exchanger 18. In this way, further thermal economies are effected. Additionally, the water fed by line 40 may be condensate from the first heat exchanger 18. The chlorine dioxide solutions in lines 32 and 42 may be formed into a single stream 46 which may be used in a pulp mill as pulping chemical or in the bleaching of cellulosic pulps or papers.

The reduced pressure may be applied to the generators 10 and 24 in any convenient manner, such as a venturi tube or a rotary pump applied to the combined chlorine gas line 48.

The aqueous solution containing sodium chlorate and sodium chloride fed through lines 12 and 26 to the generators 10 and 24 may be obtained from a chlorate cell wherein an acid solution of sodium chloride is electrolyzed. Part of the sodium chloride is converted to sodium chlorate and hydrogen is generated in the cell. Alternatively, the solutions may be made up from the solid chemicals.

Solid chemicals may be fed directly to the generators, if desired, thereby reducing the quantity of water to be evaporated. Part of the sodium chloride feed may be replaced by hydrogen chloride. Such hydrogen chloride may be formed by burning part of the gaseous chlorine in line 48 with part of the hydrogen off-gas from the chlorate cell.

The sodium sulphate recovered in line 28 may be used to make up sodium and sulphur values in a Kraft mill recovery operation.

The process as described above, in which the reaction medium in generator 24 is heated to the reaction temperature at least in part by heat obtained from the gaseous products of generator 10, has considerable economic advantages over the operation of the same system without such heating. Where the generator 10 deposits sodium bissulphate, the reactions involved are:

Generator 10

$NaClO_3 + NaCl + 2H_2SO_4 \rightarrow 2NaHSO_4 + \frac{1}{2}Cl_2 + H_2O$

Generator 24

$NaClO_3 + NaCl + 2NaHSO_4 \rightarrow$
$2Na_2SO_4 + ClO_2 + \frac{1}{2}Cl_2 + H_2O$ Therefore, half of the total $ClO_2$ produced may be by the generator 10 and half by the generator 24. Therefore, if all of the heat requirement of the generator 24 is provided by the steam from generator 10, then the overall heat requirement is reduced by approximately one half.

In practice at the lower acidities, more water than at high acidities must be evaporated to achieve the required deposition of sodium sulphate. Further, generator 24 operates at a temperature lower than generator 10. However, the vacuum on generator 24 is greater than that on generator 10. It may be necessary to supplement the heat obtained from the steam in line 16 with further steam. It is evident, however, that a considerable saving of heat requirement is effected.

Where the generator 10 deposits sodium sesquisulphate the reactions involved are:

Generator 10:

$3NaClO_3 + 3NaCl + 4H_2SO_4 \rightarrow$
$3ClO_2 + 3/2Cl_2 + 3H_2O + 2Na_3H(SO_4)_2$ Generator 24:

$NaClO_3 + NaCl + 2Na_3H(SO_4)_2 \rightarrow$
$ClO_2 + \frac{1}{2}Cl_2 + 4Na_2SO_4 + H_2O$ In this case, three-quarters of the total $ClO_2$ produced is by the generator 10 and one-quarter by the generator 24. Only part of the steam in line 16 need be passed to heat exchanger 30. Therefore, the thermal economy is approximately ¼ of the total heat requirement in the absence of heat exchange.

The present invention may be utilized in many different ways to achieve thermal economy for a plurality of generators.

For example, a third generator may be incorporated into the system described above with reference to the drawing. This third generator operating at high acidity and under reduced pressure at the boiling point generates sodium bisulphate. The sodium bisulphate then may be used as at least part of the acid feed to the generator 10 by line 14 in place of the sulphuric acid. The generator 10 then operating at a high acidity, around 8 N, but at a lower temperature than the third generator produces sodium sesquisulphate which becomes the acid feed for the generator 24.

The gaseous products of the third generator consisting of steam, chlorine dioxide and chlorine are fed at least partially to the heat exchanger 18 of the generator 10 by line 18 to provide at least part of the heat requirement of the generator 10. Aqueous chlorine dioxide solution, containing some dissolved chlorine may pass out of the heat exchanger 18 to line 32. Gaseous chlorine and any remaining chlorine dioxide recovered from the heat exchanger may pass to line 34.

In this three generator operation, the processes involved are:

First Generator:

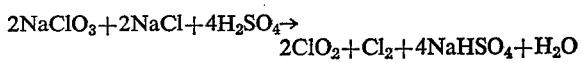
$$2NaClO_3 + 2NaCl + 4H_2SO_4 \rightarrow 2ClO_2 + Cl_2 + 4NaHSO_4 + H_2O$$

Generator 10:

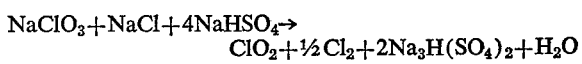
$$NaClO_3 + NaCl + 4NaHSO_4 \rightarrow ClO_2 + \tfrac{1}{2}Cl_2 + 2Na_3H(SO_4)_2 + H_2O$$

Generator 24:

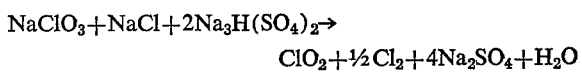
$$NaClO_3 + NaCl + 2Na_3H(SO_4)_2 \rightarrow ClO_2 + \tfrac{1}{2}Cl_2 + 4Na_2SO_4 + H_2O$$

Therefore, the chlorine dioxide capacity of the first generator is equal to the sum of the capacities of the generator 10 and generator 24, which are themselves equal in capacity.

By utilizing the gaseous products from the first generator to provide the heat requirement of generator 10 and utilizing the gaseous products from the generator 10 to provide the heat requirement of generator 24, an overall thermal economy is achieved.

In addition, a plurality of generators operating independently, i.e. with their own chlorate, chloride and acid feeds may be provided, at high acidity, low acidity or some at high and some at low acidity. The steam passing out of one generator may be used, in accordance with this invention, to provide at least part of the heat requirement of at least one other generator. The steam passing out of another generator whose heat requirement is provided by the steam from the one generator may be utilized to provide at least part of the heat requirement of at least one further generator.

The present invention is applicable to other chlorine dioxide producing processes in which a plurality of reactors are provided in which steam is used to remove the gaseous products. In copending application Ser. No. 45,850, filed June 12, 1970, and now abandoned, there is described a process of producing chlorine dioxide from a hydrochloric acid-based system in which the HCl acts both as the reducing agent and the acid medium and reacts with an alkali metal chlorate, generally sodium chlorate. The chlorine dioxide and chlorine formed are removed from the reaction zone by steam.

In such HCl-based processes, where the alkali metal chlorate is sodium chlorate, the basic reaction involved is:

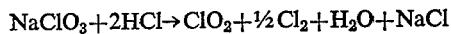
$$NaClO_3 + 2HCl \rightarrow ClO_2 + \tfrac{1}{2}Cl_2 + H_2O + NaCl$$

and the competing reaction is:

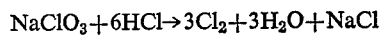
$$NaClO_3 + 6HCl \rightarrow 3Cl_2 + 3H_2O + NaCl$$

The second reaction becomes significant when an excess of hydrochloric acid exists in the feed over the stoichiometry of the first equation. It is preferred therefore to operate at molar concentrations of $Cl^-:ClO_3^-$ in the feed of approximately 2:1.

The generator preferably is maintained under reduced pressure and at the boiling point of the reaction medium. Under these circumstances, steam is formed and removes the chlorine dioxide and chlorine products from the generator. The generator preferably is operated to deposit the sodium chloride, although in some cases, the quantity of water evaporated may be insufficient to achieve this.

A plurality of such generators may be provided, each producing chlorine dioxide and chlorine. In accordance with the present invention, the steam formed in one generator is utilized to provide at least part of the heat requirement of at least one further generator. Steam generated in a further generator may be utilized to provide at least part of the heat requirement of another generator. Thus, a large chlorine dioxide capacity operation may be conducted involving a plurality of generators with a substantial saving in the overall heat requirement.

In a particular embodiment of the process described in the above-mentioned application, Ser. No. 45,850, two chlorine dioxide generators are provided, one based on hydrochloric acid and the other based on sulphuric acid. In the first generator, chlorine dioxide and chlorine are produced from sodium chlorate and hydrochloric acid, the gaseous products being removed by steam evaporated from the aqueous reaction medium. Sodium chloride is deposited from the medium and recovered from the generator.

In the second generator, chlorine dioxide and chlorine are formed from sodium chlorate, sodium chloride and sulphuric acid. The sodium chloride deposited in the first generator is used as at least part of the sodium chloride requirement of the second generator. In accordance with the present invention, the steam formed in the first generator is utilized to provide at least part of the heat requirement of the second generator.

The sulphuric acid-based generator may be of any convenient form and a sodium sulphate is formed. By utilizing a combination of a hydrochloric acid-based chlorine dioxide process with a sulphuric acid-based chlorine dioxide process, the quantity of sodium sulphate produced per unit quantity of chlorine dioxide is reduced as compared to a wholly sulphuric acid-based operation.

With increases in the efficiency of pulp mill recovery operations, the quantity of sodium sulphate required as make-up of sodium and sulphur values is decreasing. By utilizing a combination of a hydrochloric acid-based generator with a sulphuric acid-based generator, and by utilizing the steam formed in the hydrochloric acid-based generator to provide the heat requirement of the sulphuric acid-based generator, the quantity of chlorine dioxide produced may provide all of the bleaching requirement of the mill while the quantity of sodium sulphate produced may be reduced to a level to provide all of the make-up requirement of the recovery system without any excess ovr this requirement. At the same time, the heat requirement is substantially reduced.

The sulphuric acid-based process may be a process such as described in the above-mentioned Canadian Pat. 825,084 or in Canadian Pat. 826,577. Alternatively, this process may be the so-called "R2" process described in Canadian Pat. 543,589, issued July 16, 1957 to Electric Reduction Company of Canada, Limited.

In the process of Canadian Pat. 825,084 and in the low acidity operation of Canadian Pat. 826,577 operated under the conditions of Canadian Pat. 825,084, steam is formed to remove the chlorine dioxide and chlorine and a sodium sulphate is deposited. This steam may be utilized to provide the heat requirement of a further sulphuric acid-based generator. Therefore, a hydrochloric acid-based process may be utilized to provide the sodium chloride and heat requirement of a sulphuric acid-based process which in turn is utilized to provide the heat requirement for a further sulphuric acid-based process.

If the first of such sulphuric acid-based processes is operated at an acidity greater than 4.8 N thereby depositing a sodium acid sulphate and the second operates at a low acidity below 4.8 N, then in accordance with the process of the above-mentioned copending Canadian application Ser. No. 084,077, the sodium acid sulphate may be used to provide the acid requirement of the second sulphuric acid generator.

The present invention is applicable to a plurality of individual chlorine dioxide processes, at least one of which is operated to evaporate water and to utilize the steam to remove the chlorine dioxide and chlorine. The steam then is utilized to provide at least part of the heat requirement of at least one other member of the plurality.

Another sulphuric acid-based chlorine dioxide-producing process which may be employed in the processes of the invention is that described in copending Canadian application 072,527, filed Jan. 20, 1970 in which sodium sulphate is converted to sodium chloride by the use of hydrogen chloride gas.

In addition to sulphuric acid and hydrochloric acid-based chlorine dioxide-producing systems, the present invention also is applicable to chlorine dioxide processes employing phosphoric acid as the acid medium.

As indicated above, the alkali metal chlorate, generally sodium chlorate, which is reduced to form chlorine dioxide, usually is fed to the reaction zones in the form of an aqueous solution. Such aqueous solution may be formed by electrolysis of an acid alkali metal chloride solution. The cells utilized for such electrolysis generally are of two types, those with carbon electrodes and those with titanium metal electrodes. The titanium metal electrode cells generally are operated at higher temperatures, often in the region of the boiling point of the liquor, than the carbon electrode cells.

The cell liquor may be heat exchanged with the first of plurality of chlorine dioxide generators to provide at least part of the heat requirement of that generator. Steam produced in that generator then is utilized in accordance with the present invention to provide at least part of the heat requirement of a further chlorine dioxide generator.

Modifications are possible within the scope of the invention.

I claim:

1. A process for the production of chlorine dioxide which comprises forming chlorine dioxide by reducing an alkali metal chlorate in a first acid aqueous reaction medium in a first reaction zone at a first elevated temperature below the temperature above which substantial decomposition of chlorine dioxide would occur, and simultaneously evaporating water from said first medium thereby to form a gaseous mixture comprising steam and chlorine dioxide, removing said gaseous mixture from said first reaction zone, forming chlorine dioxide by reducing an alkali metal chlorate in a second acid aqueous reaction medium in a second reaction zone physically separate from said first reaction zone at a second elevated temperature lower than said first elevated temperature, passing said removed gaseous mixture into heat exchange relationship with said second reaction medium to provide at least part of the heat required to maintain said second elevated temperature, and recovering the chlorine dioxide formed in said first and second reaction zones.

2. The process of claim 1 wherein said first and second reaction media each comprises an alkali metal chlorate, a chloride selected from an alkali metal chloride and hydrogen chloride, and sulphuric acid.

3. The process of claim 1 wherein said first and second reaction media each comprises sodium chlorate, sodium chloride and sulphuric acid and has an acidity above 4.8 N.

4. The process of claim 1 wherein said first and second reaction media each comprises sodium chlorate, sodium chloride and sulphuric acid and has an acidity below 4.8 N.

5. The process of claim 1 wherein said first and second reaction media each comprises an alkali metal chlorate and hydrochloric acid.

6. The process of claim 1 wherein said first reaction zone is maintained under reduced pressure and said first reaction medium is maintained at a boiling temperature.

7. The process of claim 1 wherein both said first and second reaction zones are maintained under reduced pressure and both said first and second reaction media are maintained at a boiling temperature.

8. The process of claim 1 wherein said gaseous mixture provides all of the heat required to attain said second elevated temperature.

9. A process for the production of chlorine dioxide which comprises generating chlorine dioxide and chlorine from a first aqueous reaction medium having an acidity in excess of 4.8 N in a first reaction zone at a first elevated temperature below the temperature above which substantial decomposition of chlorine dioxide would occur, said first reaction medium comprising sodium chlorate, a chloride selected from sodium chloride, hydrogen chloride and mixtures thereof, and sulphuric acid, and simultaneously evaporating sufficient water from said first reaction medium to precipitate a sodium acid sulphate in said first zone, and thereby form a gaseous mixture consisting of steam, chlorine dioxide and chlorine, removing said gaseous mixture from said first reaction zone, removing said sodium acid sulphate from said first zone, forming a second aqueous reaction medium having an acidity less than 4.8 N in a second reaction zone physically separate from said first reaction zone by feeding to an aqueous solution containing sodium chlorate and a chloride selected from sodium chloride, hydrogen chloride and mixtures thereof, a sulphate ion-containing acid material, utilizing at least part of said removed sodium acid sulphate as at least part of said sulphate ion-containing acid material, generating chlorine dioxide and chlorine from said second reaction medium in said second zone at a second elevated temperature lower than said first elevated temperature, simultaneously evaporating sufficient water from said second reaction medium to precipitate anhydrous sodium sulphate in said second zone, passing said removed gaseous mixture into heat exchange relationship with said second reaction medium to provide at least part of the heat required to maintain said second elevated temperature, and recovering chlorine dioxide and chlorine generated in said first and second zones.

10. The process of claim 9 wherein said first and second reaction media are maintained at a boiling temperaure and said first and second zones are maintained under reduced pressure.

11. The process of claim 9 wherein said sodium acid sulphate precipitated in said first zone constitutes the sole source of acidity of said second reaction medium.

12. The process of claim 9 wherein said first reaction medium has an acidity of from 6 to 12 N and said second reaction medium has an acidity of from 2 to 4.8 N.

13. The process of claim 9 wherein said second elevated temperature is attained wholly by said heat exchange.

14. A process for the production of chlorine dioxide which comprises generating chlorine dioxide and chlorine from a first aqueous reaction medium having an acidity in excess of 4.8 N in a first reaction zone at a first elevated temperature below the temperature above which substantial decomposition of chlorine dioxide would occur, said first reaction medium comprising sodium chlorate, a chloride selected from sodium chloride, hydrogen chloride and mixtures thereof, and sulphuric acid, and simultaneously evaporating sufficient water from said first reaction medium to precipitate sodium bisulphate in said first zone and thereby forming a first gaseous mixture consisting of steam, chlorine dioxide and chlorine, removing said first gaseous mixture from said first reaction zone, removing said sodium bisulphate from said first zone, forming a second aqueous reaction medium having an acidity in excess of 4.8 N in a second reaction zone physically separate from said first reaction zone by feeding to an aqueous solution containing sodium chlorate and a chloride selected from sodium chloride, hydrochloric acid and mixtures thereof, a sulphate ion-containing acidic material, utilizing at least part of said removed sodium bisulphate as at least part of said sulphate ion-containing acidic material, generating chlorine dioxide and chlorine from said second reaction medium in said second zone at a second elevated temperature lower than said first elevated temperature, simultaneously evaporating sufficient water from said second reaction medium to precipitate sodium sesquisulphate in said second zone and thereby forming a second gaseous mixture consisting of steam, chlorine dioxide and chlorine, passing said first gaseous mixture in heat exchange relationship with said second reaction medium to provide at least part of the heat required to maintain said second elevated temperature, removing said second gaseous mixture from said second reaction zone, removing said sodium sesquisulphate from said second zone, forming a third aqueous reaction medium having an acidity less than 4.8 N in a third reaction zone physically separate from both said first and second reaction zones by feeding to an aqueous solution containing sodium chlorate and a chloride selected from sodium chloride, hydrogen chloride and mixtures thereof, a sulphate ion-containing acidic material, utilizing at least part of said removed sodium sesquisulphate as at least part of said sulphate ion-containing acid material, generating chlorine dioxide and chlorine from said third reaction medium in said third zone at a third elevated temperature lower than said second elevated temperature, simultaneously evaporating sufficient water from said third reaction medium to precipitate anhydrous sodium sulphate in said third zone, passing said second gaseous mixture into heat exchange relationship with said third reaction medium to provide at least part of the heat required to maintain said third elevated temperature heat exchange between said second gaseous mixture and said third, and recovering the chlorine dioxide and chlorine generated in said first, second and third zones.

15. The process of claim 14 wherein said first, second and third reaction media are maintained at a boiling temperature and said first, second and third zones are maintained under reduced pressure.

16. The process of claim 14 wherein said sodium bisulphate precipitated in said first zone constitutes the sole source of acidity of said second reaction medium and said sodium sesquisulphate precipitated in said second zone constitutes the sole source of acidity of said third reaction medium.

17. The process of claim 14 wherein said second elevated temperature is attained wholly by said heat exchange between said first gaseous mixture and said second reaction medium and said third elevated temperature is attained wholly by said heat exchange between said second gaseous mixture and said third reaction medium.

18. A process for the production of chlorine dioxide which comprises forming a first aqueous reaction medium containing sodium chlorate and hydrochloric acid in a first reaction zone, heating said first reaction medium to a first elevated temperature below the temperature above which substantial decomposition of chlorine dioxide would occur thereby simultaneously to generate chlorine dioxide and chlorine, to evaporate water from said medium to form a gaseous mixture consisting of said chlorine dioxide and chlorine and said evaporated water, and to deposit sodium chloride, removing said gaseous mixture from said first reaction zone, removing said deposited sodium chloride from said first reaction zone, forming a second aqueous reaction medium containing sodium chlorate, sodium chloride and sulphuric acid in a second reaction zone, utilizing said removed sodium chloride to provide at least part of said sodium chloride in said reaction zone by feeding at least part of said removed sodium chloride to said second reaction zone, heating said second reaction medium to a second elevated temperature below said first elevated temperature to effect reaction between said sodium chlorate, sodium chloride and sulphuric acid thereby simultaneously to generate chlorine dioxide and chlorine and to form a sodium sulphate, passing said gaseous mixture into heat exchange relationship with said second reaction medium, and recovering said chlorine dioxide and chlorine formed in said first and second reaction zones.

19. The process of claim 18 wherein said heating is achieved wholly by said heat exchange.

20. The process of claim 18 wherein said first reaction medium is maintained at a boiling temperature and said first reaction zone is maintained under reduced pressure.

21. A process for the production of chlorine dioxide which comprises electrolyzing an aqueous solution of an alkali metal chloride in an electrolysis zone at a first elevated temperature to form an aqueous solution containing an alkali metal chlorate, recovering said alkali metal chlorate from said electrolysis zone, reducing said alkali metal chlorate in a first acid aqueous reaction medium in a first reaction zone at a second elevated temperature lower than said first elevated temperature and below the temperature above which substantial decomposition of chlorine dioxide would occur, and simultaneously evaporating water from said first medium to form a gaseous mixture comprising steam and chlorine dioxide, removing said gaseous mixture, establishing a heat exchange relationship between said electrolysis zone and said first reaction zone to maintain said second elevated temperature, forming chlorine dioxide by reducing an alkali metal chlorate in a second acid aqueous reaction medium at a third elevated temperature lower than said second elevated temperature, passing said gaseous mixture in heat exchange relationship with said second reaction medium to provide at least part of the heat required to maintain said third elevated temperature, and recovering chlorine dioxide formed in said first and second zones.

References Cited
UNITED STATES PATENTS

| 3,446,584 | 5/1969 | Fuller | 23—152 |
| 3,607,027 | 9/1971 | Westerlund | 23—219 |
| 3,563,702 | 2/1971 | Partridge et al. | 23—121 |
| 3,524,728 | 8/1970 | Westerlund | 23—152 |

OTHER REFERENCES

Olsen: "Unit Processes and Principles of Chemical Engineering," D. Van Nostrand Company, Inc., New York, 1932, pp 1–3.

OSCAR R. VERTIZ, Primary Examiner

H. S. MILLER, Assistant Examiner

U.S. Cl. X.R.

423—504, 552